F. H. A. BOUYER, FILS.
HAND OPERATED TILLING IMPLEMENT.
APPLICATION FILED OCT. 15, 1912.
1,086,642.
Patented Feb. 10, 1914.
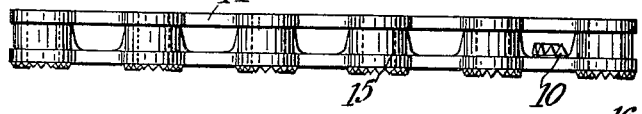
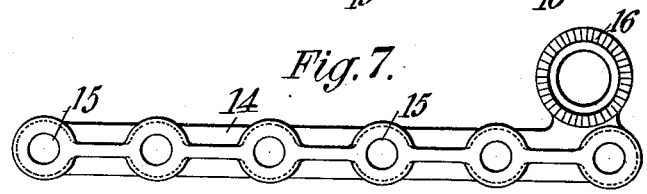
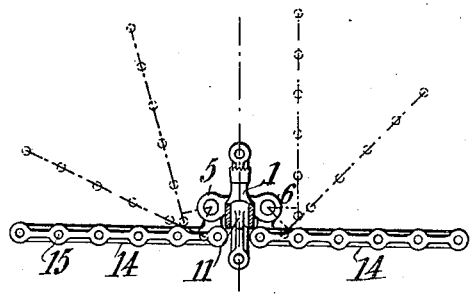
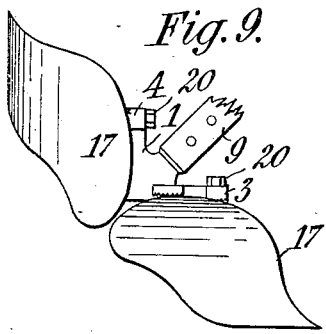
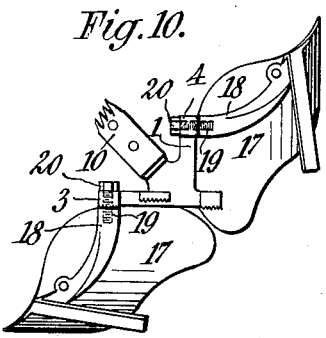

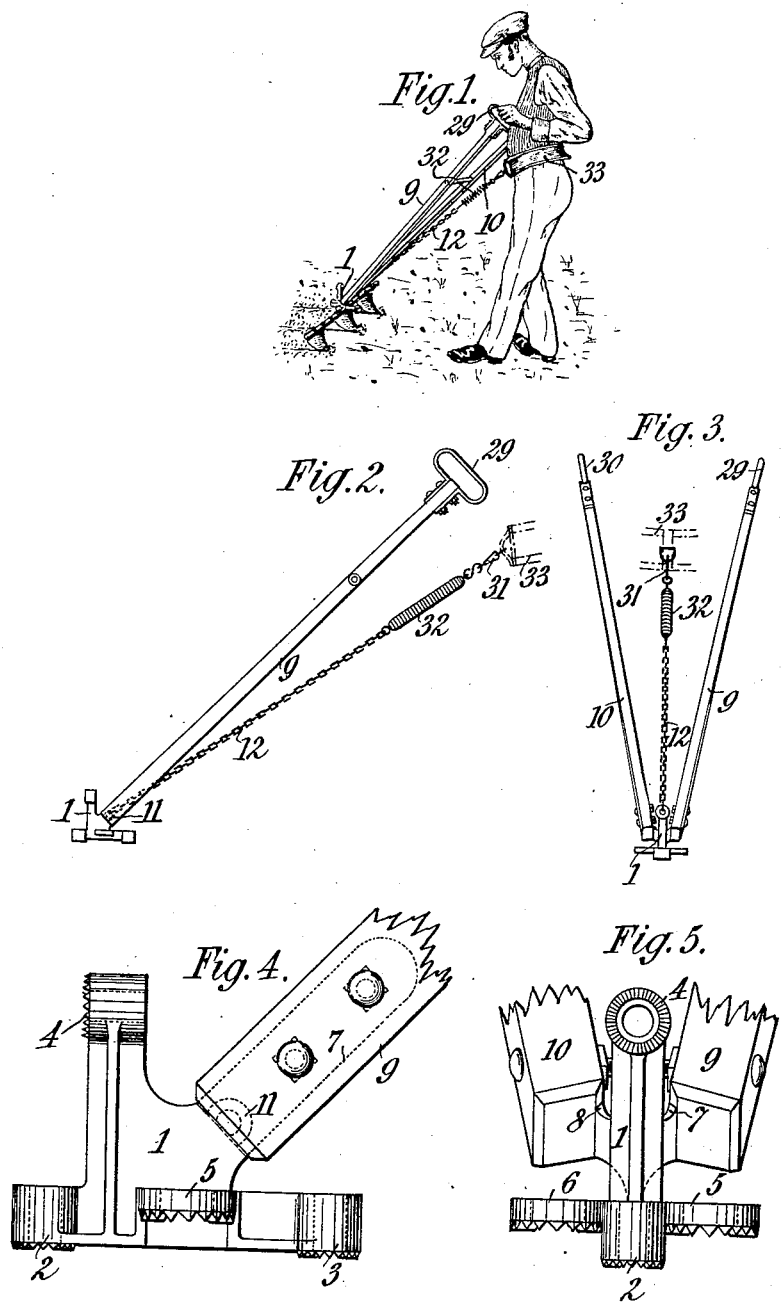

UNITED STATES PATENT OFFICE.

FELIX HENRI ALBERT BOUYER, FILS, OF ST. NAZAIRE, FRANCE.

HAND-OPERATED TILLING IMPLEMENT.

1,086,642.

Specification of Letters Patent.

Patented Feb. 10, 1914.

Application filed October 15, 1912. Serial No. 725,861.

*To all whom it may concern:*

Be it known that I, FELIX HENRI ALBERT BOUYER, fils, a citizen of the Republic of France, residing in St. Nazaire, Loire Inferieure, France, have invented certain new and useful Improvements in Hand-Operated Tilling Implements, of which the following is a specification.

The present invention relates to a device which is particularly designed to be used for cultivating and gardening and it has for its object to provide a working tool which instead of being pushed by the operator is driven by traction by the said operator who is walking backward and is acting by the force of his reins increased by his weight, while steering the tool by his hands.

This device consists of two stilts with handles, jointed at one end through a head member to which can be fixed one of the working tools to be driven, a chain or rod forming a draft implement being attached, on the one hand, to the head member holding the tool and, on the other hand, to a belt carried by the operator.

The tools can be secured to the head member fixed to the stilt ends, either directly or through adjustable arms.

Two mold-boards directly mounted upon the head member, so as to form a plow, have been illustrated by way of an example.

In order that the features and advantages of this new tracting and steering device might be better understood, the same will now be described by way of example with reference to the annexed drawings in which:

Figure 1 is a perspective view of the instrument showing the working position of the operator when operating the same. Figs. 2 and 3 are side and front views of the whole tracting and steering device. Figs. 4 and 5 are side and front views of the head member drawn on a larger scale. Figs. 6 and 7 are enlarged front and plan views of one of the adjustable arms. Fig. 8 is a plan view showing the several positions which the arms can assume with regard to the head member on which they are mounted. Figs. 9 and 10 are front and back views of the end of the instrument shown as a plow.

The head 1 on which the tool is mounted as hereinafter described is fixed by two extensions or cheeks 7 and 8 to the end of stanchions or stilts 9 and 10 ending in handles 29 and 30, and which in the working position are in a plane inclined at 45° with the ground. The head member also carries a ring 11 to which is attached the end of the chain or drawing rod 12 forming a draft provided with a traction absorbing spring 32 which is attached at its opposite end to a carbine hook 31 on the belt 33 of the operator.

By walking backward, the operator thus pulls on the working tool and is acting by the force of his reins and weight and thereby exerts the greatest pulling strain, while steering easily by means of the handles 29 and 30. For cultivation works this method of traction has a further advantage in that the cultivated ground is not stamped by the operator.

The head 1 has a first group of three lugs with indented edge the two, 2 and 3, of which have vertical axis and the third 4 a horizontal axis at right angle to and in the plane of the axis of the lugs 2 and 3, the whole being used for fixing directly the tools upon the head 1; two other lugs 5 and 6, also with indented edge, are further provided laterally in the horizontal plane of the lugs 2 and 3 and allow of jointing, on the head 1, two adjustable arms 14 upon which cultivating and gardening tools can be mounted.

As shown in Fig. 7, the arms 14 which have a series of holes 15 with indented edge are arranged in the prolongation of each other and can be secured on the head 1 by a lug with indented edge 16, which is bolted on one of the lugs 5 and 6 of the head, whereby the said arms can be adjustable in the various positions shown by the half-dotted lines in Fig. 8. In the holes 15 are jointed the working tools.

In Figs. 9 and 10 are shown two mold-boards 17 directly mounted upon the head 1 to form a plow. These mold-boards 17 each carry an added part 18 with a screw threaded hole 19 which is brought opposite one of the lugs 3 or 4 the axis of which are at right angles, the said added part being fixed upon the head 1 by means of a screw 20 extending through the lug and is screwed in the threaded hole 19. Thus the right or left hand mold-boards can be presented to the ground by turning the instrument upside down, the stilts having still the same incline to the ground. This device allows of working with fixed mold-boards, doing away with all locking parts and thus making the whole perfectly rigid.

In order to increase the adhesion to the ground of the tool mounted on the head or to cause the tool to enter more or less into the ground, the head is loaded with a mass, of varying weight which is secured to the front lug 2.

Having thus described and ascertained the nature of my invention, and in what manner the same is to be performed what I now claim is:

A tracting and steering device for hand operated instruments, particularly used for cultivating, comprising a working tool fixed on a metal head jointed to the end of two stilts 9 and 10, a chain or drawing rod 12 forming a draft device by means of which the instrument can be pulled by the operator walking backward and handles 29 and 30 for steering the said instrument, substantially as described.

In witness whereof I have hereunto signed my name in the presence of two subscribing witnesses.

FELIX HENRI ALBERT BOUYER, Fils.

Witnesses:
GABRIEL BELLIARD,
LUCIEN MEMMINGER.

---

Copies of this patent may be obtained for five cents each, by addressing the "Commissioner of Patents, Washington, D. C."